United States Patent
Giral et al.

(10) Patent No.: US 9,924,293 B2
(45) Date of Patent: Mar. 20, 2018

(54) MOBILE APPLICATIONS INCORPORATING MOBILE-BASED TRANSACTIONS DETECTION AND MONITORING MEANS

(71) Applicant: CA, INC., New York, NY (US)

(72) Inventors: Erhan Giral, Daly City, CA (US); Corey Cohen, Matawan, NJ (US)

(73) Assignee: CA, INC., New York, NY (US)

( * ) Notice: Subject to any disclaimer, the term of this patent is extended or adjusted under 35 U.S.C. 154(b) by 603 days.

(21) Appl. No.: 14/517,452

(22) Filed: Oct. 17, 2014

(65) Prior Publication Data
US 2016/0112822 A1 Apr. 21, 2016

(51) Int. Cl.
| H04M 3/42 | (2006.01) |
| H04W 4/00 | (2018.01) |
| H04W 24/02 | (2009.01) |
| H04L 12/24 | (2006.01) |
| H04L 12/26 | (2006.01) |

(52) U.S. Cl.
CPC .......... *H04W 4/003* (2013.01); *H04L 41/082* (2013.01); *H04L 41/085* (2013.01); *H04L 41/0823* (2013.01); *H04L 41/0836* (2013.01); *H04L 43/06* (2013.01); *H04L 43/10* (2013.01); *H04W 24/02* (2013.01)

(58) Field of Classification Search
CPC ............... H04L 41/082; H04L 41/0836; H04L 41/0823; H04L 41/085; H04L 43/06; H04L 43/10; H04W 24/00; H04W 24/02
See application file for complete search history.

(56) References Cited

U.S. PATENT DOCUMENTS

| 8,595,810 B1* | 11/2013 | Ben Ayed | H04L 63/0815 713/168 |
| 2010/0246484 A1* | 9/2010 | Hirano | H04W 8/065 370/328 |
| 2012/0087267 A1* | 4/2012 | Norair | H04W 24/10 370/252 |
| 2015/0382208 A1* | 12/2015 | Elliott | G06F 17/30424 370/252 |

* cited by examiner

*Primary Examiner* — Khalid Shaheed
(74) *Attorney, Agent, or Firm* — Vierra Magen Marcus LLP

(57) ABSTRACT

Client to server service request and response interactions are monitored. The service requests have embedded therein mobility-dedicated and business organization oriented reporting headers. At the server side of the interactions, a snooping agent picks up information from the headers, combines it with service performance metrics (e.g., time to service the request) and stores the data in a relational database. Queries are afterwards submitted to the database to spot trends including those showing emerging problems and areas for improvement in providing customers who use mobile devices with seamless and high quality service.

25 Claims, 9 Drawing Sheets

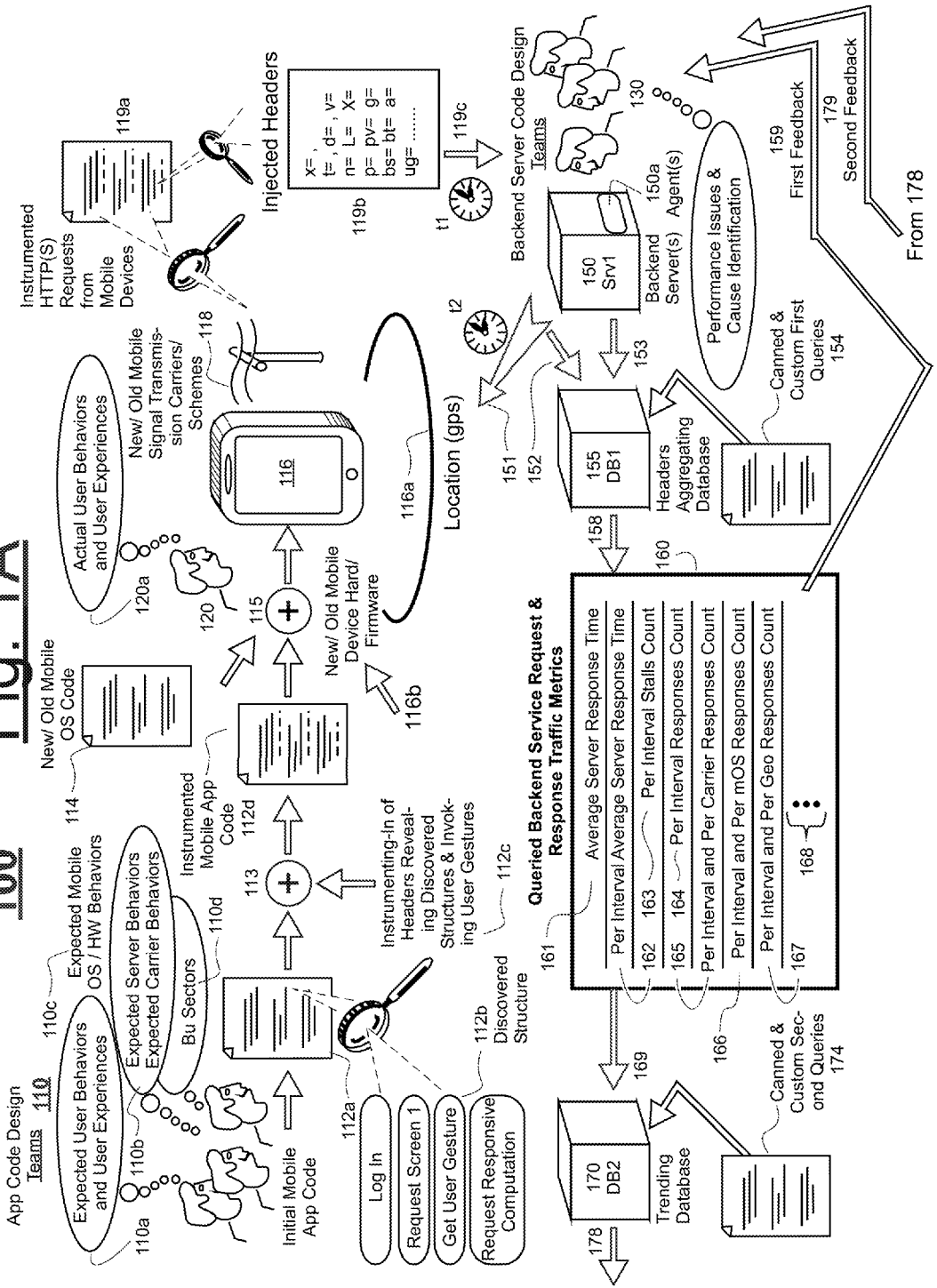

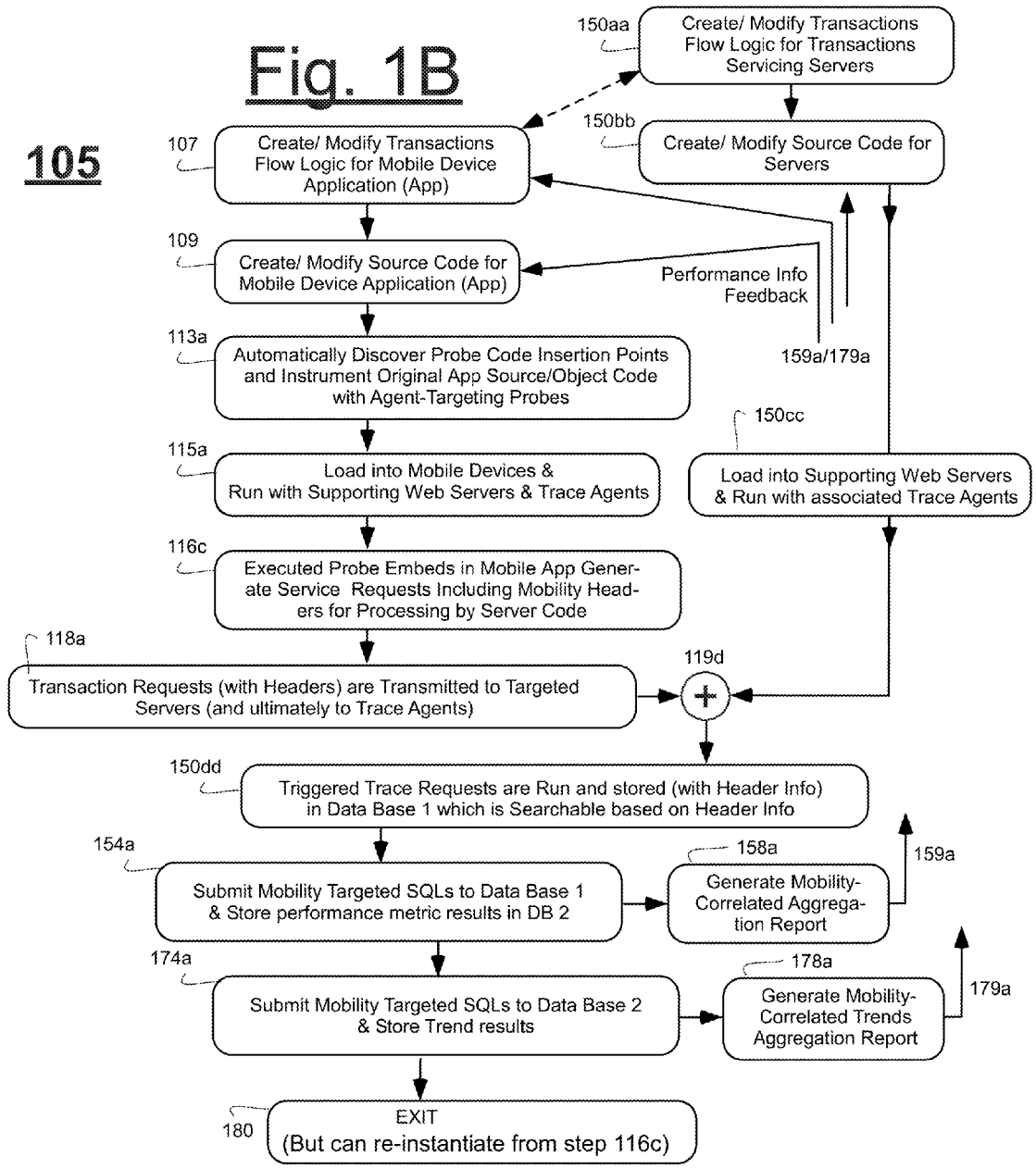

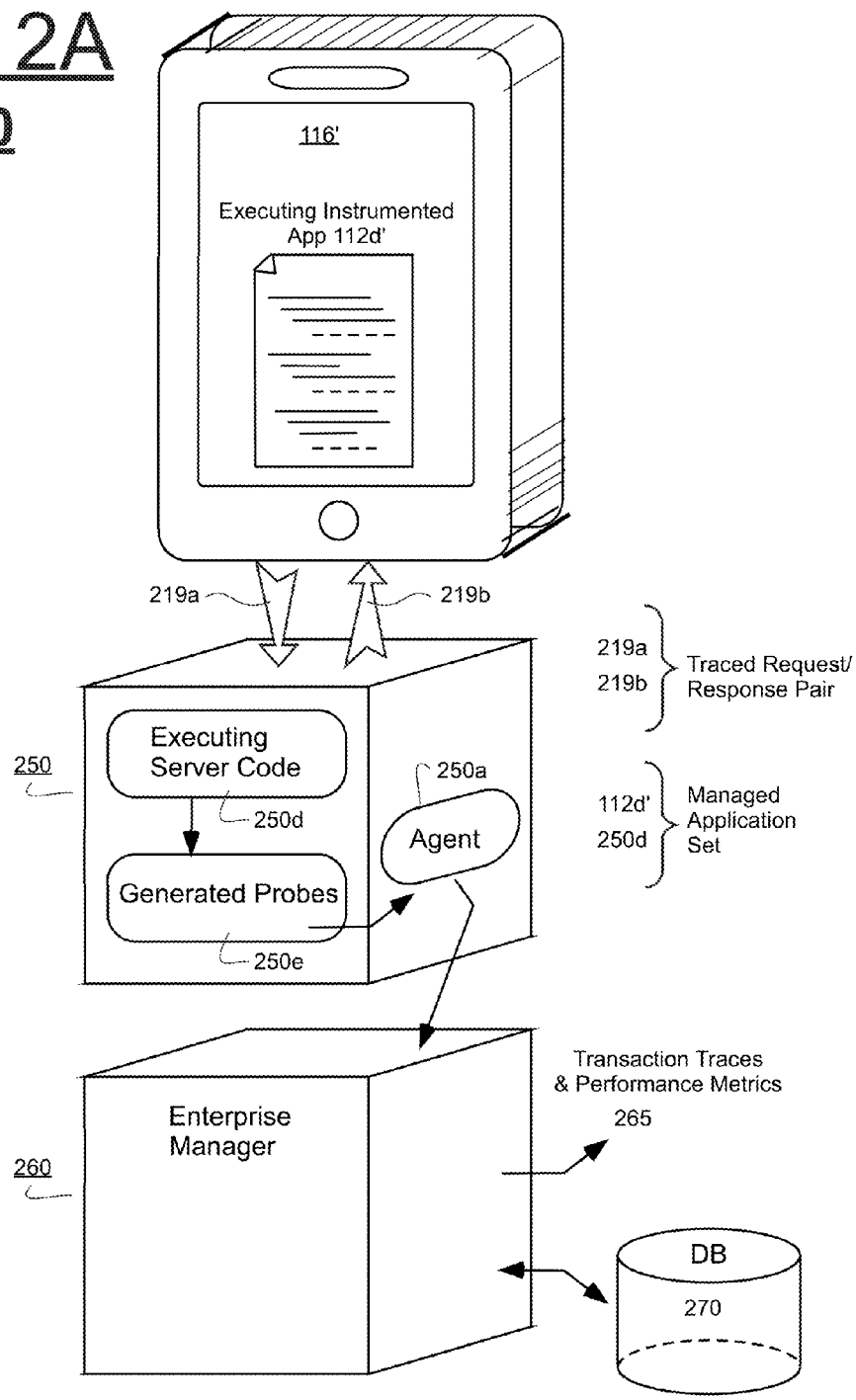

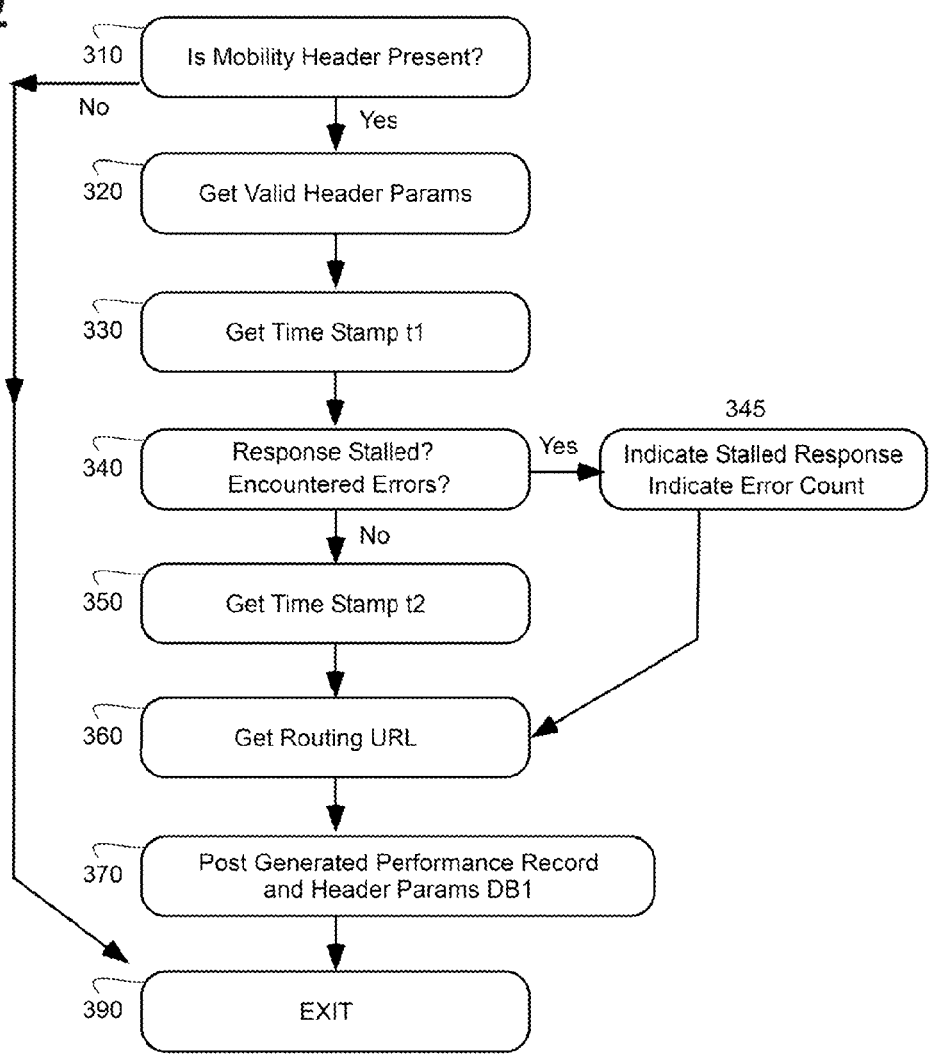

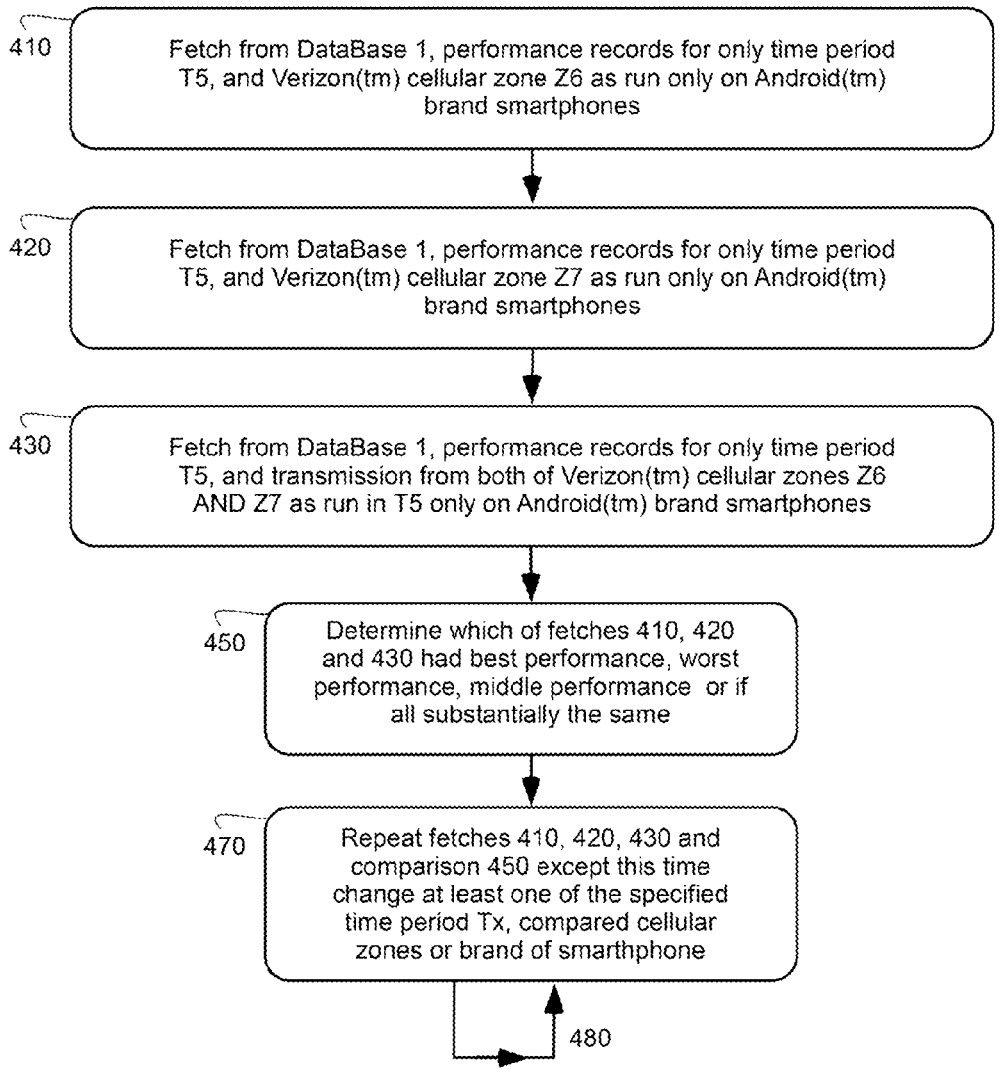

MOBILE APPLICATIONS INCORPORATING MOBILE-BASED TRANSACTIONS DETECTION AND MONITORING MEANS

FIELD OF DISCLOSURE

The present disclosure relates generally to transactions between mobile data processing devices (e.g., smartphones, tablet computers) and service-providing servers (e.g., cloud-based internet servers) that the mobile data processing devices wirelessly couple with. The disclosure relates more specifically to machine-implemented methods of enabling server operators to obtain aggregate and/or individualized metrics respecting how their servers are responding to requests sourced from applications running on mobile data processing devices and how mobile device users are experiencing interactions with the mobile-based application programs and the service-providing servers.

DESCRIPTION OF RELATED TECHNOLOGY

The pictures, menus, sounds and/or other outputs that are often provided by way of the display screens and/or other user interface components of miniaturized smartphones, smartwatches and other such mobile data processing devices are usually sourced from larger and on-network computers (e.g., in-cloud data processing mechanisms) known as servers at the behest of application programs ("apps") running on the mobile devices. Servers are used because the miniaturized mobile devices (e.g., handhelds) themselves generally have insufficient data storing and/or data processing capabilities for performing all desired functionalities and instead the observed behaviors of the mobile devices rely on the larger, faster and on-network resources of the servers in a manner that creates an appearance of the mobile devices having greater capabilities than they alone actually do have. By way of example, one or more servers may source a long, high definition audio-video file as streamed data to a mobile device in segments that are sequentially requested from respective ones of the sourcing servers as an application running on the mobile device needs them. To the user, it may appear as if the mobile device itself is sourcing the long audio-video performance although the case is one of a well-coordinated dance between the mobile device and its remote service providing servers.

Ideally, what the user experiences during such a dance is a seamless sequence of interactions in which expected behaviors by his or her mobile device appear to take place with almost no delay (e.g., within no more than a split second or one or a few seconds) and with expected types of responsive results, (e.g., displayed images, output sounds, generated mathematical results, etc.) appearing just in time and in the correct order so that the user remains unaware of the background processes that make the mobile-based experience possible.

However, on the backend, or server(s') side of the process, the delivery of seamless service to the user population is often not that simple. Service request signals may come in from many mobile devices all at once with the requesting mobile devices having different hardware and/or firmware designs, different operating systems and/or versions thereof, different signal transmission providing service companies (e.g., cellular telephony companies) providing the request signals. Additionally, the service requests may come in from different request sourcing locations (including from moving vehicles), may arrive as a result of different user gesturing or other interfacing actions with their respective mobile devices and also due to different codings of the client application programs or "apps" that have been loaded into the respective mobile devices of such users. Moreover, service requests may come in as concurrent bunches that might overwhelm a given server's ability to simultaneously deal with all of them and/or service requests may come in with computationally demanding requests that strain the server's data processing capabilities.

Backend server operators are often tasked with the job of determining when user requests are not being quickly and/or seamlessly responded to and of identifying the root causes of such service lapses. The fault may lie in how the server farm is organized or it may instead lie elsewhere, for example with the cellular phone link provider. Without appropriate diagnostic tools, the server operators are left to mere guesswork and may easily come to wrong conclusions and time-wasting efforts to cure non-existent problems, where in the process they may create new problems (e.g., introduce new bugs into the system).

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

Structures and methods may be provided in accordance with the present disclosure for enabling system operators to monitor for and detect lapses and/or degradations in providing end users of mobile devices with high quality and apparently seamless services.

More specifically, in accordance with one aspect of the present disclosure, service requests arrive at a server from an instrumented app executing on a mobile device where the arriving service request signals are tagged with mobility-sourced headers injected into the hypertext transfer protocol (HTTP or HTTPS) code of the service requests and where the special 'mobile sourced' headers provide additional information relating to the state of the executing mobile device app as well as the nature of the mobile device itself and the nature of the business organization and business transactions and flows that are desired to occur by the organization that the arriving service request is linked to. As a result, business oriented metrics (measurements) can be accumulated by using database searches that sort according to parameters within the headers of received requests. Yet more specifically, one exemplary database query made to a database storing such headers (and associated performance traces) may ask how many of all transactions for an identified business sector came from Apple iPhone™ owners, how many came from Google Android™ owners and how many from owners of other brands of smart phones. Another may ask which customer base for the identified business sector is growing and which is shrinking and in which geographic areas. Business organizations may then tailor their marketing and/or other activities accordingly. In other words, the database searches can query the database records looking for commonality of mobility tracking data in cases where the corresponding performance records report subpar performance (or above par performance) for one or more performance metrics of the corresponding request servicing transactions and thus a correlation between the in-common parts of the mobility tracking data and the subpar performances (or above par performances) can be identified and reacted to (e.g., by fixing problems associated with the in-common parts of the mobility tracking data).

In accordance with another aspect of the present disclosure, fault tracing diagnostics may be developed that discriminate among different business sector transactions, different geographies, different communications providing service companies, different mobile devices and so on, such that the search for root cause of failure or delay may be better isolated in the case mobile device based applications (apps).

Other aspects of the disclosure will become apparent from the below detailed description.

BRIEF DESCRIPTION OF THE DRAWINGS

The below detailed description section makes reference to the accompanying drawings, in which:

FIG. 1A is a block diagram of a monitoring and detecting machine system in accordance with the present disclosure;

FIG. 1B is a flowchart depicting process steps that may take place in an embodiment of the system of FIG. 1A;

FIG. 2A is a schematic diagram showing at a simplified level the flow of interaction signals that may take place in an embodiment of the system of FIG. 1A;

FIG. 3 is a flowchart depicting a machine-implemented method for automatically generating data base records; and FIG. 4 is a flowchart depicting a machine-implemented method for comparing performances based on use of header parameters.

DETAILED DESCRIPTION

Figure 2B:
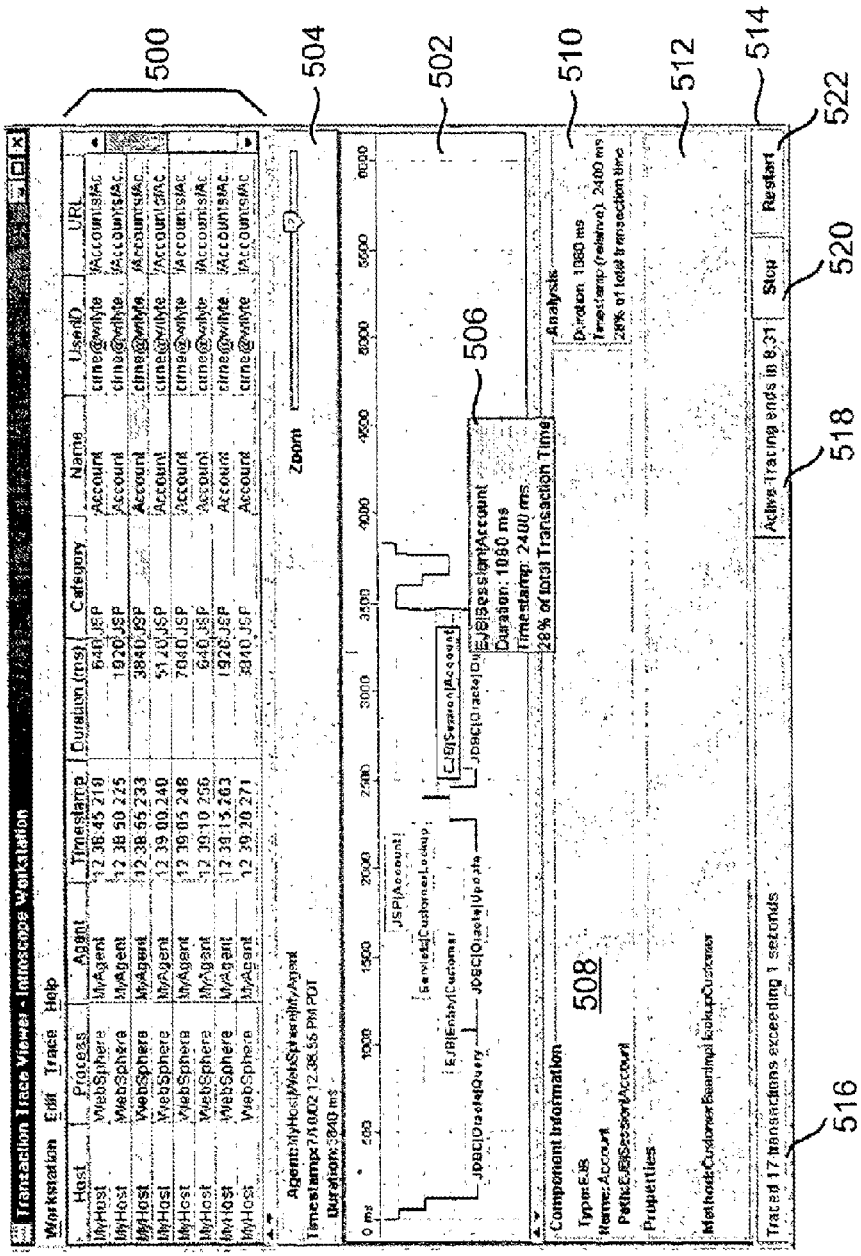
FIG. 2B is a screen shot showing an exemplary transaction trace that may be generated with use of an embodiment of the system of FIG. 1A.

FIG. 1A is a block diagram of a monitoring and detecting machine system 100 and its environment, where the machine system 100 as well as uses thereof are in accordance with the present disclosure.

In terms of a quick and introductory walk through, item 112a represents recorded digital code (i.e. object code or source code) that is initially defined and stored in a memory for instructing a target class of mobile devices to perform in accordance with a defined client-side application program (or 'mobile app' for short) where the mobile app has been designed to service a particular business organization (e.g., Book Store #1) in accordance with how that particular business organization chooses to organize itself. Item 112d represents an instrumented version of the original code 112a. Step 115 represents the loading of the instrumented code 112d as well as a current version of a mobile operating system (mOS) 114 into a currently on-hand mobile device 116 (where the latest version of the mOS 114 may be pre-loaded before the instrumented app code 112d, although sometimes the sequence is vice versa with a new version of the mOS 114 being loaded after the app code 112d has been loaded). Although not explicitly shown, step 115 may further represent the loading of new firmware driving signals into a firmware portion of the mobile device 116. Examples of revisable firmware may include, but is not limited to, portions of the mobile device 116 that: (a) determine at the physical interface layer of the mobile device 116 or at interface layers immediately above it how the mobile device 116 communicates with compatible networks including wireless networks, (b) determine at the physical control layer of the mobile device 116 or at control layers immediately above it how the mobile device 116 controls at least one of power management aspects of the device's hardware, display management aspects of the device's hardware, audio management aspects of the device's hardware, location determination aspects of the device's hardware, security aspects of the device's hardware, and so on.

Item 118 represents a transmission and routing (through a routing fabric—not shown) of service request signals (for example in the form of instrumented HTTP or HTTPS signals) by way of a currently-used mobile signal transmission carrier (e.g., Verizon™, ATT™) from the client mobile device 116, through a routing network (e.g., internet) and to one or more identified servers residing on the internet (e.g., in a cloud) or elsewhere (e.g., in an intranet). Step 119c represents receipt of the service request signals 118 at a specified server 150 (e.g., specified by a URL included in the transmitted service request signals 118) and at a first time point, t1. Step 151 represents the outputting of responsive service-providing signals by the specified server 150 at time t2 for return transmission (could be by pathway 118 or by another communication pathway) to the request-sourcing mobile device 116. Steps 152-153 represent an organized aggregation of header information (119b) plus associated diagnostic traces (not shown) into a first database 155 (DB1) where the aggregation provides communication traffic metrics as well as traffic measurement data (e.g., the delay between t1 and t2) for storage in the corresponding, headers-aggregating first database 155 (DB1). Item 160 represents an example of some of monitoring and detection results that may be automatically and repeatedly extracted from the headers aggregating database 155. Item 170 represents a historical (trends reporting) database which collects the output result signals (160) of the first database 155 and uses the collected results to identify trends and departures of performance from expectations. The output results 178 of the second database 170 (DB2) may be fed back (179) to a backend servers coding and managing team 130. The output results 160 of the first database 155 (DB1) may also be fed back (159) to the backend servers coding and managing team 130. Some or all of the feedback results, 159 and 179, may be shared with front-end app code design teams 110 and/or with business organization designers (not shown—see instead group 203 of FIG. 2C). The feedback results, 159 and 179, can constitute useful information and knowledge that enables the design teams 110 and 130 (and also the business organization designers—not shown) to knowledgeably deal with emerging and/or present service problems within the system 100 and to perhaps improve performance and services offered to customers.

Still referring to FIG. 1A, details thereof are now described more fully. One and often more persons 110 are usually made responsible for initial design and follow-up updates to what is referred to here as the initial client-side app code 112a (physical digital coding that is non-ephemerally stored in a non-ephemeral, physical storage medium). Often the initial app code 112a is relatively large and complex such that numerous teams 110 of people work on defining coarse and finer behavioral details that are subsequently to occur on a target class of mobile devices 116 as a result of the initial app code 112a.

Figure 2C:
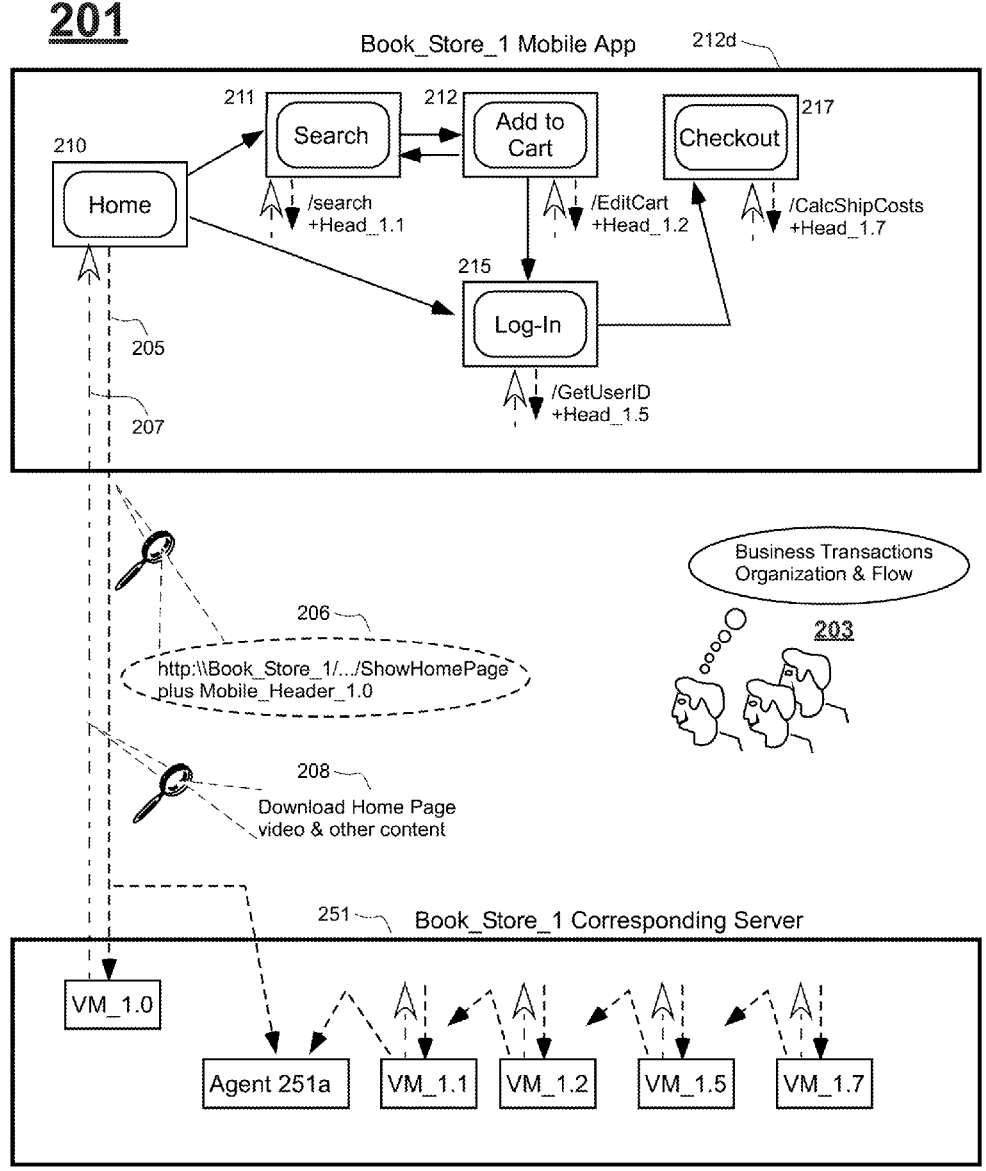
FIG. 2C is a schematic diagram showing a first business organization as might be used for example by a first book selling company.
Figure 2D:
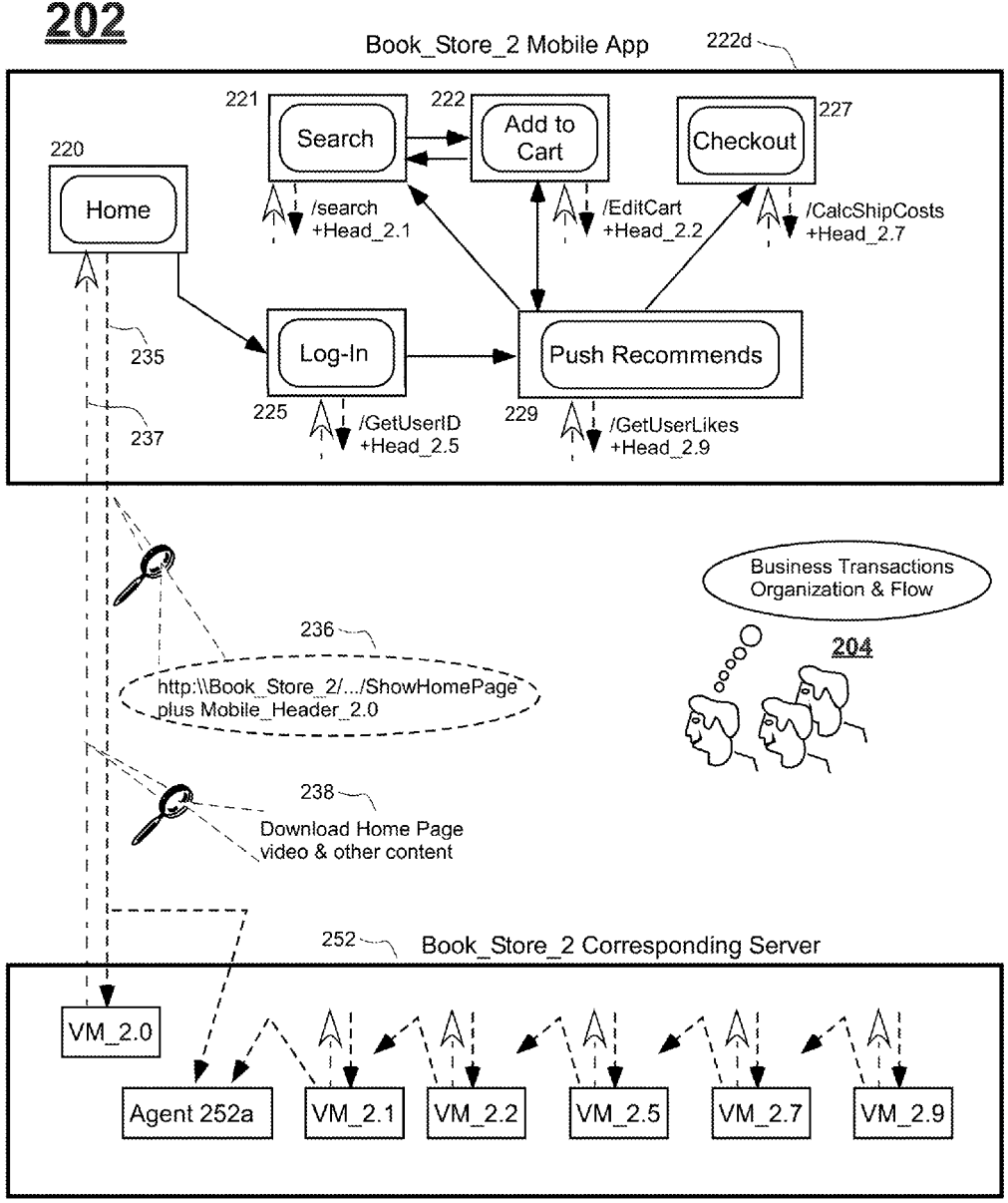
FIG. 2D is a schematic diagram showing a second business organization and its transaction flows, as might be used for example by a second book selling company.

Although not shown in FIG. 1A, where this aspect is to be explicated when FIGS. 2C-2D are discussed, the coarser behavioral details may include how a business organization plans to interact with its clients (user experience) in the form of discrete business sector areas and flows from one such sector to a next. For example, the business organization plan may determine whether customers log-in first or whether they are encouraged to run a search first for products and/or services. Business organization planners may wonder how the chosen organization influences customer behavior in different geographic areas as well as influencing data processing behaviors within the system 100. These coarser aspects of behavioral analysis are to be distinguished from deep level program behaviors such as those involving how much of local memory resources (within the mobile device) the initial app code 112a consumes.

In developing the initial app code 112a, the corresponding app code design teams 110 will have respective expectations of how their respective portions of the code will be experienced by targeted end users 120 and how the end users will typically interact with those code portions. This first expectation is depicted in FIG. 1A as thought bubble 110a.

The app code design teams 110 will also have respective expectations of how their portions of the client-side code will be responded to by corresponding backend servers (e.g., 150) when service requests are output by the app code portions over well behaving transmission carrier connections (e.g., 118). For example, how quickly will the backend servers be able to return appropriate responses to mobile device source requests? These further expectations are depicted as thought bubble 110b. Moreover, the app code design teams 110 will have respective expectations of how their portion of the code will be responded to by the currently present hardware, firmware and other software within the targeted class of mobile devices 116. These additional expectations are depicted as thought bubble 110c. Additionally, the app code design teams 110 will have been given directions or will have on their own designed the coarser level, transactions organization of the system 100 under the assumption that such will not greatly affect how end-users or the system in whole behaves. These assumptions are depicted as thought bubble 110d. Of course, expectations, assumptions and actual results may not always be one and the same. When things go awry, it is difficult to determine where the root fault lies.

Consider a simple example of several client-side app code portions as depicted in magnified section 112b of FIG. 1A. A first portion may handle user log-in. This may be carried out in conjunction with a log-in processing server (not shown). A second app code portion may collect user demography data obtained during log-in and then responsively present the user with a first screen-full of choices, for example in the form of a scrollable menu having gesture-selectable action items (not shown). A third app code portion may obtain responsive user input(s). Based on the obtained user input(s), a fourth app code portion may request resource-intensive computations that are to be carried out in a respective and external server (e.g., 150). More specifically, one such request for computations may ask for a determination of how many bargain-priced hard copy books of a specified genre or title are currently available within the local warehouses of a given book-selling company and what the quality of those hard copy books are (e.g., like-new versus worn and marked up). This task is generally beyond the capabilities of the mobile device itself and is thus handed off to an external server such as server 150.

What the initial code designers 110 may not know at particular points in time is that the end user 120 has recently replaced his old model, mobile device 116 with a newly released one 116b and has nonetheless loaded the old app code into it, or that the entity which provides the operating system 114 has made a very recent revision and the end user 120 has updated his OS version, or that the end user is traveling through a geographic location 116a where communication services 118 are of poor quality and the service requests 119a and/or responses 151 cannot be properly and/or timely transmitted as a result. Yet another piece of information that the initial code designers 110 may not be aware of at particular points in time is that the end user 120 was not able to easily navigate to an expected request screen number 1 (shown in magnification 112b) and instead used an unexpected sequence of gestures and/or alternate navigation steps to get to the computation requesting step within example 112b.

In accordance with the present disclosure, the initial app code 112a (which could be source code and/or object code) is automatically instrumented in a step 113 so as to include headers-outputting code 112c (typically added as object code into a compiled version of the initial app code 112a; e.g., as Java bytecode) that reveals internal structures of the initial app code 112a and provides additional information relating to mobility aspects and user interface aspects of the utilized mobile device 116 whereby the consequentially output headers (119b) can be used to generate valuable knowledge (for example first and second feedback signals 159 and 179 as shall be detailed below). Incidentally, it should be noted that the discussions herein are directed to mobile client devices as opposed to stationary desktop computers or the like, where the latter do not have issues relating to, for example, cellular telephony interconnection problems such as while moving between different cellular areas, miniaturized screen sizes and/or concerns with battery discharge rates. The request-response pair behaviors of non-mobile devices may also be monitored and analyzed with use of other types of headers injected into their respective request streams. However, the headers discussed herein are specifically designed for use with mobile client devices and for detection of request-response pair behaviors peculiar to such mobile client devices and to the on-network servers that service them in accordance with specified business organization structures (e.g., see briefly FIGS. 2C-2D). However, in yet other embodiments, the business structures revealing headers and technology disclosed herein can be used with non-mobile devices.

Step 115 of FIG. 1A represents the loading of the instrumented app code 112d into the targeted mobile device 116 and the optional various combinations and/or permutations of further possibilities where the latter may include an afterward or beforehand loading of a new or revised operating system 114 into the mobile device 116, an afterward or beforehand loading of other software (e.g., interfering software) into client device 116 and the beforehand substitution (116b) of alternate hardware and/or firmware for what constitutes that mobile device 116.

In addition to the variations represented by step 115, the mobile device 116 is of course, 'mobile' and thus may be located at or moving through different geographic locations 116a (e.g., cellular service zones) as its request signals (119a) are sent out and as corresponding responses (151) attempt to come back. The location(s) of the mobile device 116 may be determined in real time by GPS and/or other location determining means embedded within the mobile device 116 or nearby (e.g., near field location identifying stations). Different geographic locations 116a and/or crossovers between them may have respective issues associated therewith, for example in terms of communication signal strengths, interference from local noise source, appropriate location-based responses, appropriate transfer of responsibility during cellular zone crossovers, and so on.

Users of mobile devices generally sign up for cellular communication services 118 as provided by different communication service providers (e.g., Verizon™, ATT™, T-Mobile™) and these may come in different flavors (e.g., 3G, 4G, 4GLTE, WiMAX, WiFi) as well as different qualities of service in different locales and/or at different times. User experience (120a) may vary as a function of such factors. The 110 initial code designers 110 may wish to take such variances into account when designing the initial code 112a.

As indicated by magnifications 119a and 119b, the instrumented-in monitoring code 112c causes mobility-specific headers 119b to be automatically included in the request signals that are routed (e.g., via the internet) to respective servers and/or respective virtual machines (VM's—see briefly FIGS. 2C-2D) executing within such servers, where in one embodiment the headers 119b have the following parameters structure:

Header Parameter Structure

A single header full of name/value parameter pairs may be used to encode information relevant to mobile-based transactions. The header parameters can consist of several semicolon (';') separated attributes. Total parameter value sizes may be limited such that parameters exceeding their respective limits will be ignored by the header processing agent (e.g., 251a of FIG. 2C).

TABLE 1

| Parameter Name | Parameter Function |
| --- | --- |
| x = | This parameter identifies the header type as a Mobility Analytics one. Mobility Analytics related headers can be uniquely separated from non-mobility ones and can be sent to appropriate Mobility Analytics Agents at the server side. |
| t = | This property identifies a tenant organization for which the Mobility Analytics code is being run where the tenant can be one of plural tenant organizations that the receiving server and/or Mobility Analytics Agent services. This ID allows the database queries to pair tenants with respective tenant related parameters. |
| d = | This property holds the originating mobile device's unique ID. The database can then be used to trace the activities of individual mobile devices although generally server administrators are interested in performance tracing for large pools of users as opposed to individual users. |
| v = | This property identifies the version of the MAA (Mobility Analytics) instrumentation program (SDK) that created this header. |
| n = | Wireless provider that originator device is connected to at the time of the request. (Verizon ™, ATT ™, etc.) |
| L = | Wireless connection type that originator device was utilizing at the time of the request. (WiFi, LTE, 3g, WiFi, etc.) |
| xbtt = | This optional property defines the "type" of this external business transaction. Possible values are: [type1, type2, etc.] |
| p = | Handheld device's general type of operating system. (Apple iOS7 ™, Google Android ™, etc.) |
| pv = | Handheld device's specific operating system version. (7.1, Gingerbread, etc.) |
| g = | Geographic location of Handheld device. Specifies comma-separated values for longitude and latitude, indicating where the transaction was originated. |
| bs = | This property holds the parent Business Service Name for this this request as defined by the tenant organization, MAA instrumentation program (SDK) determines the business service name and it is either a copy of the mobile application's name or a literal that the app developer choses. |
| bt = | This property holds the parent Business Transaction Name for this request. The MAA instrumentation program (SDK) that created this header provides this Business Transaction Name as well as the business service name and the platform ID. Business Transaction Name is determined automatically based on the structure of the mobile app (form/screen name) or specified as a literal by the app developer. The post-receipt, Application Program Management analytics (APM) may construct a unique database query by combining the BT name with the BS identifier and the platform ID. The post-receipt analytics (APM) may then aggregate metrics (e.g., performance traces) for example, for all requests that are marked with the same mOS (mobile operating system), same business sector and same business transaction within that business sector (same {p, pv, bs, bt} parameters). |
| a = | Mobile App name as specified by the instrumenting MAA SDK |
| ug = | User gestures that immediately preceded the output of this header marked service request, for example scroll menu up 3 slots and double tap |

TABLE 2

Sample Header Parameter x= x-apm-bt:
t=4F2504E0-4F89-9B0C-0305E82C2301;
d=2b6f0cc904d137be2e1730235f5664094b831186; v=1.0; n=ATT;
L=3g; p=iOS; pv=7.1; g=94015-1523; a=Buy_A_Book
App; bs=Find Used Books Section; bt=Buy Book Now;
ug=scroll_up2_and_singleTap In the given example of TABLE 2, the x parameter identifies the instrumentation-wise injected header as a mobile-sourced and business transaction identifying one that is to be handled by a corresponding, mobility-oriented agent at the server side of the analytics process. The cellular carrier is identified as ATT™ 3G speed service. The mobile device operating system (mOS) is identified as Apple™ iOS version 7.1. The mobile device app is identified as being named "Buy_A_Book". The involved business sector (bs) is identified as the "Find Used Books Section" and the invoked code portion or business transaction (bt) is identified as "Buy Book Now". Additionally, it is reported that the user (120) recently interacted with the mobile device's user interface (e.g., in the last 10 seconds) by gesturing with a 2 line scroll up command followed by a single tap on the mobile device touch screen. One or more of the parameters may be used in a database query to provide useful reports on how the server and/or system and/or user population is behaving in the face of different environmental circumstances.

Referring yet further to FIG. 1A, after the instrumented request signal 119a that includes the injected header 119b is routed to and received by a corresponding server 150 (or by a corresponding virtual machine VM executing in a host server 150), and more specifically by a corresponding trace-producing agent 150a, a time of receipt stamp (t1) is logically associated with (e.g., attached to) the header information. The server 150 processes the request(s) within the instrumented request signal 119a and at a second time, t2 outputs corresponding response signals 151 for routing back to the request sourcing mobile device 116.

Embedded within the server 150 is a headers snooping and trace generating agent 150a that is configured to detect mobile-dedicated headers such as 119b and to compile performance metrics associated with mobile-dedicated headers 119b (either for all such detected headers or for headers whose service request-response pairs violated a predetermined threshold). The compiled performance metrics may include one or more of: the URL and/or other routing parameters that caused the corresponding service request to be routed to the given server 150; the corresponding server response time (t2 minus t1); an indication that the server response time exceeded a predetermined maximum threshold and thus constitutes a "stall" (an excessively delayed response, due for example to the server being overwhelmed by concurrent other tasks); an indication that the server encountered one or more exceptions (processing errors) while trying to service the request; an indication that the service request was received during an identified one of predetermined service intervals (e.g., where each service interval is a fraction of a specified longer time unit, say a half of, a third of, a quarter of, a fifth of, a sixth of or a twelfth on an hour for example) and so on.

The snooped header data 119b, the associated time stamps (t1, t2), associated routing-to-server information (e.g., URL) and/or the various other performance indicators (e.g., performance traces—see FIG. 2B) are cross-linked with one another and stored as such in a first relational database 155 (DB1). Pre-canned and/or custom tailored queries 154 are then automatically and repeatedly supplied to the first database 155 (DB1) so as to automatically and repeatedly generate performance reports 160 where the produced reports 160 are then stored in a second database 170 (DB2).

In one embodiment, produced reports 160 each indicates two or more of the following, but not limited thereto metrics: an average server response time 161 for a prespecified long time period (e.g., for the day or for the last hour and also for all, or for a specified one or more of metric-selecting parameters in header 119b, for example for a specified business transaction, bt="Buy_Book_Now"), a per interval server response time 162 (again, for all, or for a specified one or more of the parameters in header 119b); a per interval stalls count 163 (again, for all, or for a specified one or more of the parameters in header 119b); a per interval responses count 164 (for all of the parameters in header 119b); a per interval and per carrier responses count 165 (using the n=parameter of the headers as a query criteria); a per interval and per mobile device operating system (mOS) responses count 166 (using the p= and/or pv= parameters of the headers as query criteria); a per interval and per geographic location responses count 167 (using the g=parameter of the headers as a query criteria); and/or other such performance metrics 168 where the query criteria can include specific business organization units and/or specific business transaction steps (e.g., Buy_Book_Now) called for by the respective organization unit(s). An indication of concurrent invocations and/or number of invocations (service requests) per interval may also be included in each report 160 (for all, or for a specified one or more of the parameters in header 119b) so that database users (e.g., 130) can easily determine if and which request sourcing entities (e.g., a specific business transaction (bt), a specific customer subpopulation (Android™ users) might be primarily responsible for overstressing or being most demanding of server resources. Appropriate re-design actions may then be taken.

It may be appreciated that with appropriate query criteria, users (e.g., 130) of the first database 155 can find out which of demographic subsectors of end users 120 (e.g., iOS™ users versus Android™ users) are the ones successfully using the respective app 112a and/or which are having the most trouble with it or not using it at all. Appropriate re-design or other corrective actions may then be taken.

In one embodiment, the produced reports 160 are automatically and repeatedly stored in the second or historical database 170 (DB2) so that historical trend reports 178 can be generated. For example, the historical trend reports 178 may indicate that one of demographic subsectors of end users 120 (e.g., iOS™ users versus Android™ users) is making increasing use of the respective app 112a while the other is showing declining use. Appropriate re-design or other corrective actions may then be taken. As in the case of the first database, respective pre-canned and/or custom tailored queries 174 may be automatically and repeatedly supplied to the second database 170 (DB2) so as to automatically and repeatedly produce performance reports 178 that indicate historical trends of interest. In the latter case, proactive re-design or other corrective actions may be taken even before a nascent problem grows to become a significant one.

Either or both of the first database reports 160 and second database reports 178 may be used (as indicated by feedback signal paths 159 and 179) by the backend server design and management teams 130 to better understand how the system is behaving and what the root causes of emerging problems might be (or where room for improvement lies). The knowledge that the backend server design and management teams 130 acquire from this may be shared in part or whole with the front end app code design teams 110. Additionally, and although not explicitly shown in FIG. 1A, the acquired knowledge may be shared in part or whole with business organization design teams (e.g., 203-204 of FIGS. 2C and 2D).

Referring now to FIG. 2A, shown is a schematic diagram showing at a simplified level the flow of interaction signals that may take place in an embodiment of the system of FIG. 1A. The executing app code 112d' within mobile device 116' and the corresponding request-serving server code 250d within server 250 is termed a "managed" application set. In response to receipt of an instrumented request 219a, the correspondingly executing server code 250d generates one or more probes 250e that are passed off to a trace generating agent 250a also provided within the server (or elsewhere). The agent 250a interacts with an Enterprise Manager 260. The latter couples to an Enterprise Management Database 270. As the managed application set 112d'/250d runs, probes (e.g. 250e) relay relevant runtime execution data to Agent 250a. Agent 250a then collects and summarizes the data, and sends it to Enterprise Manager 260. Enterprise Manager 260 receives performance data from managed application sets (with 112d'/250d being one of plural such sets) from corresponding Agents (with 250a being one of plural such Agents), runs requested calculations, makes performance data 265 available for example on coupled thereto workstations (not shown) and optionally sends performance data to at least a first database 270 for later analysis of the generated performance data. The workstations (not shown) may have graphical user interfaces for graphically displaying the performance data. In one embodiment, the workstations provide two main windows: a console and an explorer. The console displays performance data in a set of customizable views. The explorer depicts alerts and calculators that filter performance data so that the data can be viewed in a meaningful way. Elements of the workstations that organize, manipulate, filter and display performance data include actions, alerts, calculators, dashboards, persistent collections, metric groupings, comparisons, smart triggers and SNMP collections. In one embodiment, the instrumented requests 219a are instrumented to automatically initiate transaction tracing on all or some of the Agents managed by an Enterprise Manager by for example specifying respective threshold trace periods. All transactions probed by an Agent and found to have execution times exceeding their specified threshold levels are traced and reported to the Enterprise Manager 260, which then routes the generated trace information (and associated header information) to the appropriate workstations who have registered interest in the trace information. The workstations may then present GUI displays that list all transactions exceeding their respectively specified thresholds. For each listed transaction, a visualization that enables a user to immediately understand where time was being spent in the traced transaction can be provided.

Although not all explicitly depicted in FIG. 2A, it is to be understood that the illustrated system 200 generally comprises one or more networks (e.g., signal routing fabrics; for example that carrying request-response pairs 219a/219b), respective data processing devices (e.g., 116', 250, 260) each having respective one or more network interfaces configured for appropriately interfacing with the networks they are coupled to; one or more non-volatile storage devices (e.g., magnetic, optical, phase change and/or electrostatic based data storage devices); and they each may have one or more processor units in operative communication with their respective network interfaces and their respective one or more non-volatile storage devices for thereby receiving requests and/or outputting responses via their respective network interfaces and/or storing the requests and/or responses as well as data developed during intermediate processing.

More specifically, referring to FIG. 2B, shown is one example of a graphical user interface display that can be used for reporting transactions. The GUI display includes a transaction trace table 500 which lists all of the transactions that have satisfied the filter (e.g. execution time greater than the threshold). Because the number of rows on the table may be bigger than the allotted space, the transaction trace table 500 can scroll. Table 3, below, provides a description of each of the columns of transaction trace table 500.

TABLE 3

| Column Header | Value |
|---|---|
| Host | Host that the traced Agent is running on |
| Process | Agent Process name |
| Agent | Agent ID |
| TimeStamp | TimeStamp (in Agent's JVM's clock) of the (HH:MM:SS.DDD) initiation of the Trace Instance's root entry point |
| Category | Type of component being invoked at the root level of the Trace Instance. This maps to the first segment of the component's relative blame stack: Examples include Servlets, JSP, EJB, JNDI, JDBC, etc. |
| Name | Name of the component being invoked. This maps to the last segment of the blamed component's metric path. (e.g., for "Servlets|MyServlet", Category would be Servlets, and Name would be MyServlet). |
| URL | If the root level component is a Servlet or JSP, the URL passed to the Servlet/JSP to invoke this Trace Instance. If the application server provides services to see the externally visible URL (which may differ from the converted URL passed to the Servlet/JSP) then the externally visible URL will be used in preference to the "standard" URL that would be seen in any J2EE Servlet or JSP. If the root level component is not a Servlet or JSP, no value is provided |
| Duration (ms) | Execution time of the root level component in the Transaction Trace data |
| UserID | If the root level component is a Servlet or JSP, and the Agent can successfully detect UserID's in the managed application, the UserID associated with the JSP or Servlet's invocation. If there is no UserID, or the UserID cannot be detected, or the root level component is not a Servlet or JSP, then there will be no value placed in this column. |

Each transaction that has an execution time greater than its specified threshold time period will appear in the transaction trace table 500. The user can select any of the transactions in the transaction trace table by clicking with the mouse or using a different means for selecting a row. When a transaction is selected, detailed information about that transaction will be displayed in transaction snapshot 502 and snapshot header 504.

Transaction snapshot 502 provides information about which transactions are called and for how long. Transaction snapshot 502 includes views (see the rectangles) for various transactions, which will be discussed below. If the user positions a mouse (or other pointer) over any of the views, mouse-over info box 506 is provided. Mouse-over info box 506 indicates the following information for a component:

name/type, duration, timestamp and percentage of the transaction time that the component was executing. More information about transaction snapshot 502 will be explained below. Transaction snapshot header 504 includes identification of the Agent providing the selected transaction, the timestamp of when that transaction was initiated, and the duration. Transaction snapshot header 504 also includes a slider to zoom in or zoom out the level of detail of the timing information in transaction snapshot 502. The zooming can be done in real time.

In addition to the transaction snapshot, the GUI will also provide additional information about any of the transactions within the transaction snapshot 502. If the user selects any of the transactions (e.g., by clicking on a view), detailed information about that transaction is provided in regions 508, 510, and 512 of the GUI. Region 508 provides component information, including the type of component, the name the system has given to that component and a path to that component. Region 510 provides analysis of that component, including the duration the component was executing, a timestamp for when that component started relative to the start of the entire transaction, and an indication the percentage of the transaction time that the component was executing. Region 512 includes indication of any properties. These properties are one or more of the parameters that are stored in the Blame Stack, as discussed above.

The GUI also includes a status bar 514. The status bar includes indication 516 of how many transactions are in the transaction trace table, indication 518 of how much time is left for tracing based on the session length, a stop button 520 and a restart button 522. In one embodiment, and although not shown in FIG. 2B, the sortable database table includes column headers and/or filtering capabilities for sorting in accordance with mobility dedicated header information. In other words, traces and/or their summarizing table rows may be aggregated according to one or more of the exemplary parameters (e.g., x=; t=; d=; etc.) given in above Tables 1-2 and/or in accordance with other alike parameters provided in injected headers that provide mobility related other information.

Referring next to FIGS. 2C and 2D, shown are two possible business handling organizations, 201 and 202, for respective book-selling companies, Book_Store_1 and Book_Store_2. Both business handling organizations start their respective users at a corresponding home webpage, 210 and 220. The second book-selling company 202 (Book_Store_2) forces all potential customers who might want to buy a book from Book_Store_2 to first log-in via a required step 225. On the other hand, the first book-selling company 201 (Book_Store_1) gives its potential customers the choice of navigating to a log-in page 215 or of instead navigating to a products search page 211. After a user defined search is conducted within search page 211, Book_Store_1 gives its customers the ability to add found products to a shopping cart in page call 212 and to then return to searching 211 or proceed to checkout 217, except that the checkout page 217 must be preceded by a visit to the log-in page 215.

By contrast, because Book_Store_2 is organized (202) to force every customer to first login (225), that Book_Store_2 automatically acquires demographic data (e.g., preferences) for each logged-in user and then automatically pushes corresponding book recommendations in a subsequently displayed page 229 without forcing the user to first do his/her own search in optional page 221. There can be advantages and disadvantages to each of the depicted business handling organizations, 201 and 202, where it is to be understood that these are non-limiting simple examples.

In the given examples of FIGS. 2C-2D, when the user activates a command option (for example, by entering a search expression in page 211 or page 221 and hitting the Go button), the activated command is converted into a corresponding HTTP output signal (e.g., request signal 205) that includes a URL call (e.g., "Book_Store_X/ . . . /Search") for routing the corresponding HTTP output signal to a respective service providing server (251 or 252). In accordance with the present disclosure, the so-routed service request signal has embedded in it the corresponding injected header 119b of FIG. 1A (e.g., Mobile_Header_1.0 of 206 in FIG. 2C). As a result, the respectively routed-to server (251 or 252; and more specifically, the embedded headers snooping and/or trace generating agent thereof, 251a or 252a) acquires information about which portion of the respective business handling organization, 201 or 202, sourced the service request (119a). Note that the request routing URL (e.g., "Book_Store_X/ . . . /Search") does not necessarily inform as to where the request came from, only where it is being sent to. In other words, the request routing URL (e.g., "Book_Store_X/ . . . /Search") could have come from a stationary desktop computer (not shown). On the other hand, with the inclusion of the injected mobile-business header 119b, the corresponding headers snooping and/or trace generating agent thereof, 251a or 252a is provide with mobility-based source identifying information if for example the bs= and/or bt= parameters of the header are appropriately filled in. Thereafter, the corresponding first databases (only one shown at 155 in FIG. 1A) of respective book-selling companies, Book_Store_1 and Book_Store_2 can be queried to determine performance metrics (e.g., transaction traces) associated with their respective and different business handling organizations 201 and 202 and more specifically, sorted according to one or more of the mobility-related parameters of above Tables 1-2. Thus, it may be determined as an example, by a business transaction organization and flow analysis group 204 (shown in FIG. 2D) that Book_Store_2 is losing significant business opportunities in a geographic zone g=Northwest_portion_of_USA when it forces its potential customers to first log-in (225) whereas the same Book_Store_2 is attracting a significant increase in deal-closing business transactions in a different geographic zone g=Southeast_portion_of_USA due to its providing automatically pushed book recommendations in page 229 of business handling organization 202. In response to these determinations, the managers 204 of the exemplary Book_Store_2 may choose to bifurcate their operations and have different business handling organizations that differently handle customers entering the home page (220) from different geographic zones. The injected mobile-business header 119b of the leaving-home-page requests (navigating from 220 to 225) can provide the geographic zone information in its g=parameter. The receiving server can then responsively react differently based on the geographic origin of the service request. Similarly, the receiving server of a respective business handling organization can responsively react differently based on the different mobile device operating systems (mOS) used by different users, based on the different cellular communication service providers used by different users, and/or based on other user differentiating parameters provided by the injected mobile-business reporting headers 119b.

This is but one of the different Mobility Analytics options provided due to inclusion of the mobility dedicated headers and of the mobility dedicated headers snooping and/or trace generating agents (e.g., 251a or 252a) specified by such headers. Referring to the flowchart details of FIG. 1B, a machine-assisted process 105 in accordance with the present disclosure may include a creation or modification (step 107) of an organizational flow plan such as that of 201 in FIG. 2C or that of 202 in FIG. 2D. This is followed in step 109 by creation or modification of the app source code to be used in a respective mobile device (e.g., smartphone 116).

Complementing the business handling organizational plans and codes generated in steps 107 and 109 for the mobile client side, there often will be similar business handling organizational plans and codes generated in steps 150*aa* and 150*bb* for the server(s) side of the operations. The client side steps 107-109 and the server(s) side steps 150*aa*-150*bb* need not occur concurrently or one before the other. On the other hand, because they do interact with one another when runtime application sets (e.g., 112*d'*/250*d* of FIG. 2A) are created, it may make sense in many cases to concurrently modify both the mobile client side business handling organizational plans and codes generated (of steps 107 and 109) and those of the server(s) sides (and of steps 150*aa*-150*bb*) when major modifications are made. Such major modifications may be made in response to receipt of performance feedback information provided by way of feedback paths 159*a* and/or 179*a* (which are obtained from below-described steps 154*a* and 174*a*).

At step 113*a*, after new or modified app code has been created in step 109, the corresponding app code is automatically analyzed to discover appropriate probe code insertion points. The app code is instrumented accordingly to provide for server side performance analytics by designated agents. In accordance with the present disclosure, one or more of the instrumented spots causes the instrumented app code (e.g., 112*d'* of FIG. 2A) to output a corresponding one or more mobility-directed headers (e.g., 119*b* of FIG. 1A) in its output requests. Moreover, in accordance with the present disclosure, one or more of the designated agents (e.g., 250*a* of FIG. 2A) is configured to logically associate its generated performance data with a corresponding one or more of the mobility-associated parameters provided in the mobility-directed headers (e.g., 119*b* of FIG. 1A) such that post-receipt analytics results may be aggregated and/or filtered according to such parameters and useful mobility-directed information (e.g., 154*a*/174*a*) may be extracted from the so-aggregated and/or filtered analytics results.

At step 115*a*, the instrumented app code (e.g., 112*d'* of FIG. 2A) is loaded into predetermined mobile devices (e.g., smartphones, tablets) and thereafter run in conjunction with corresponding ones of associated servers (e.g., 250 of FIG. 2A) and performance tracing agents (e.g., 250*a* of FIG. 2A). Complimentary with the running of the app code, server code (including embedded trace agents) is caused to run in associated servers in step 150*cc*. Generally, the server code of step 150*cc* will be up and running (as pre-tested post-beta code) before general population users of the mobile devices begin using the corresponding mobile app code.

During runtime of the app code and at step 116*c*, executed ones of the Probe Embeds in the Mobile App will generate respective Service Requests (including Mobility Headers) for processing by the runtime Server Code of step 150*cc*. The joinder of these actions is representing by join symbol 119*d* in FIG. 1B.

Then in step 150*dd*, threshold-triggered ones of Trace Requests are run by their respective agents and stored (with corresponding Header Info) in Data Base 1 (e.g., 155 of FIG. 1A). The stored first database records are searchable based on the logically associated Header information. Accordingly, when in step 154*a* (which corresponds to item 154 of FIG. 1A) a mobility directed search request (e.g., written in SQL) is submitted to the Data Base 1, asking for example, for all trace records generated in a specified time period T5, only for Android™ brand smartphones and only when the latter were in cellular zone Z6 of the Verizon™ system, such specified trace records can be fetched for study and use. In one embodiment, performance summaries generated by same or similar search requests (similar in that all but that one parameter such as the time period being T6 instead of T5) submitted to DB1 (155) are logically aggregated in a second database (DB2 of step 154*a*). Thereafter, in step 174*a*, searches can be submitted looking for historical trends. For example, one such search may look for performance degradation or improvement over time periods T5, T6 and afterwards for the Android™ brand smartphones traced above with respect to only cellular zone Z6. The search results of step 154*a* may be provided (step 158*a*) in the form of a generated mobility-correlated aggregation report that identifies two or more service requests as being aggregated with one another as well as being correlated to a specified part of mobility parameter data provided in their respective headers and/or as a generated mobility-correlated aggregation report that further or alternatively identifies two or more respective performance reports generated for the service requests that are aggregated with one another due to them being correlated to the specified part of the of mobility parameter data provided in their respective headers. The generated results 158*a* may automatically produce in the corresponding machine system an alarm report (e.g., 159*a*) that flags a need to probe deeper into what the underlying cause or causes are for a trending degradation for example.

The search results of step 174*a* may be provided (step 178*a*) in the form of a generated mobility-correlated trends aggregation report that identifies trends observed for two or more service requests as being aggregated with one another as well as being correlated to a specified part of mobility parameter data provided in their respective headers and/or as a generated mobility-correlated trends aggregation report that further or alternatively identifies two or more respective performance trend reports generated for the service requests that are aggregated with one another due to them being correlated to the specified part of the of mobility parameter data provided in their respective headers. The generated trends-reporting results 178*a* may automatically produce in the corresponding machine system an alarm report (e.g., 179*a*) that flags a need to probe deeper into what the underlying cause or causes are for a trending degradation for example. At step 180 the process may be exited for subsequent repeat when at step 116*c*, other mobile devices upload service requests to their respective servers.

Figure 2E:
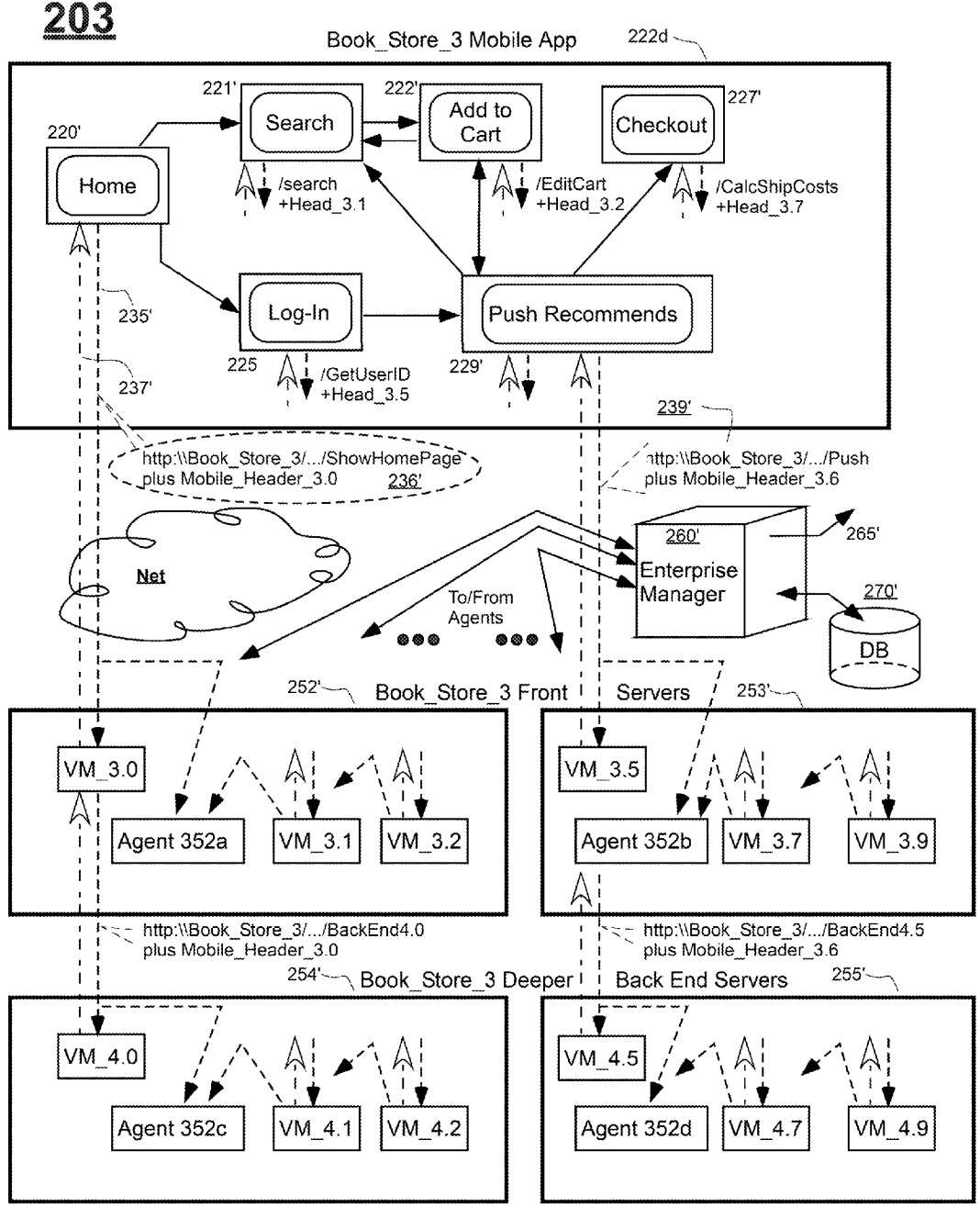
FIG. 2E is a schematic diagram showing a third business organization and its transaction flows, including employment of deep end servers, as might be used for example by a third book selling company.

Referring to FIG. 2E, it is within the contemplation of the present disclosure to forward respective mobility headers from front end servers such as 252' and 253' to corresponding, deeper back end servers such as 254' and 255' where the latter service the former. The transaction tracking agents (e.g., 352*c*, 352*d*) in the deeper back end servers (e.g., 254', 255') send corresponding performance reports and/or tracking reports to the enterprise manager 260' just as do the agents (e.g., 352*a*, 352*b*) in the front end servers (e.g., 252', 253') so that the enterprise manager 260' can track all the servers (front end and back end) affected by each transaction request (e.g., 236', 239') in accordance with one or more parameters provided the corresponding mobility headers. The respective performance reports and/or tracking reports sent to the enterprise manager 260' are stored in appropriate queriable form in a database 270' for future analysis and use in generating historical trending reports including those that forewarn of arising performance issues with the deeper back end servers such as 254' and 255'.

Referring to FIG. 3, shown is a flow chart for a machine-implemented process 300 that may be carried out by a headers snooping and trace generating agent such as 150*a* of FIG. 1A. In step 310 it is automatically determined whether a valid, mobility-business header (e.g., 119*b*) is present in a service request coming into a corresponding server 150. If no, then the process is left by way of exit node 390. On the other hand, if yes, valid ones of the parameters found in the detected header (e.g., 119*b*) are fetched while invalid ones are ignored in step 320. Then in step 330 the associated time stamp at least for time of request receipt t1 is fetched in step 340 and it is thereafter determined if a stall and/or execution completion errors are present. If yes, then the corresponding indicators for stall and/or exceptions are set in step 345. If no, the completion time stamp t2 is fetched in step 350. At optional step 360 the request sourcing URL may be fetched. At step 370, the fetched and/or generated data (including an agent-generated performance trace) is stored as queriable data within the first relational database (155). Then in step 390 an exit is made out of the process 300.

In addition to generating such searchable database records, it is within the contemplation of the present disclosure to generate canned or custom database queries that are automatically and repeatedly submitted for an advancing time window (e.g., past 30 minutes) of the database for producing analysis results such as those shown at 160 of FIG. 1A. Then the various managing groups of the system 100 can act on a knowledge based basis for determining how to improve performance and/or deal with emerging problems.

Referring to FIG. 4, shown is a flow chart for a machine-implemented process 400 that may be carried out for the purpose of isolating the geographic zone or zones of a noted performance degradation. In step 410 a first fetch is made from database 155 of all performance records generated only for a specified time period T5, and for a specified Verizon™ cellular zone Z6 as run only on Android™ brand smartphones. It is assumed here that the corresponding mobility based headers include a parameter for specifying respective cellular coverage zones of respective cellular telephony service providers.

Next, in step 420, a similar fetch is conducted except that the cellular zone qualifier is changed to be only zone Z7.

Next, in step 430, a similar fetch is conducted except that the cellular zone qualifier is changed to be for smartphones that transmitted from both of zones Z6 and Z7 during the specified time period T5. In other words, the specified smartphones experienced a crossover from one zone to the other during time period T5.

Subsequently, in step 450, a comparison is made among the three fetched performance records to see if they were all substantially the same or if one was substantially worse than the others or one was markedly better than the others. Determinations can then be made if one of zones Z6 and Z7 or a crossover between these coverage zones posed special challenges for the executing mobile app of interest.

Illustrated step 470 and return path 480 may be used for generating similar comparisons for other cellular coverage zones, other cellular telephony service providers, other brands of smartphones and/or other time periods.

The present disclosure is to be taken as illustrative rather than as limiting the scope, nature, or spirit of the present teachings. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated and taught here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Further, the functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "component," "block", "database", "agent" or "system." Furthermore, aspects of the present disclosure may take the form of a computer program product embodied in one or more non-ephemeral computer readable media having computer readable and/or executable program code embodied thereon.

Any combination of one or more computer readable media may be utilized. The computer readable media may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an appropriate electrical connection having one or more wires, a portable computer diskette, a hard disk, a random access memory (RAM), a read-only memory (ROM), an erasable programmable read-only memory (EPROM or Flash memory), an appropriate optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct/program a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The foregoing detailed description has been presented for purposes of illustration and description. It is not intended to be exhaustive or limiting to the precise form disclosed. Many modifications and variations are possible in light of the above teaching. The described embodiments were chosen in order to best explain the principles of the disclosed technology and its practical application, to thereby enable others skilled in the art to best utilize the technology in various embodiments and with various modifications as are suited to the particular use contemplated. It is intended that the scope be defined by the claims appended hereto.

What is claimed is:

1. A machine-implemented service request handling process for use with one or more servers receiving service requests from mobile devices, the process comprising:
   automatically detecting if a mobility parameters providing first header is present as part of a received first request sent from a respective first mobile device to at least one of the servers;
   automatically acquiring from the detected first header, first mobility parameter data relating to at least one of the first request and the first mobile device;
   using the acquired first mobility parameter data to search for other service requests or performance reports generated for the other service requests where the other service requests respectively have respective other mobility parameters providing headers and at least respective parts of the other mobility parameters providing headers correlate with a specified part of the first mobility parameter data;
   generating at least one performance metric for the first request measuring a predetermined aspect of at least one of the first request and its corresponding one or more request-servicing responses; and
   generating an aggregation report where the generated aggregation report identifies the first request and at least one of the other service requests as being aggregated with one another and as being correlated to the specified part of the first mobility parameter data.

2. The machine-implemented process of claim 1 wherein the generated aggregation report identifies respective performance metrics generated for the first request and for the at least one of the other service requests as being aggregated with one another as well as being correlated to the specified part of the first mobility parameter data.

3. The machine-implemented process of claim 1 and further comprising:
   automatically storing the data automatically acquired from the detected first header in a first database as data that is searchable for.

4. The machine-implemented process of claim 3 and further comprising:
   automatically storing in the first database, and as logically associated with the first header data, a performance trace that traces a performance of the service requested by the first service request.

5. The machine-implemented process of claim 3 wherein the at least one performance report generated for the first request reports on a corresponding first response completion time as the predetermined metric for the received first request and for one of its corresponding one or more request-servicing responses, the process further comprising:

automatically storing the first response completion time in the first database in logical association with the data automatically acquired from the first header; and logically associating with the first response completion time, at least one predetermined and respective other response completion time for the at least one of the other service requests of the aggregation report.

6. The machine-implemented process of claim 3 and further comprising:

automatically determining if a stall occurred or not during processing of the received first request and storing the stall yes or no indication in the first database in logical association with the data automatically acquired from the first header; and logically associating with the stall yes or no indication of the first request, at least one predetermined and respective other stall yes or no indication for the at least one of the other service requests of the aggregation report.

7. The machine-implemented process of claim 3 and further comprising:

automatically determining if one or more errors occurred during processing of the received first request and storing the errors count in the first database in logical association with the data automatically acquired from the first header; and logically associating with the errors count of the first request, at least one predetermined and respective errors count for the at least one of the other service requests of the aggregation report.

8. The machine-implemented process of claim 1 and further comprising:

automatically determining per interval metrics associated with a plurality of service requests received by the one or more servers where the automatically determined per interval metrics includes a per interval responses count associated with only an identified subset of originating mobile devices.

9. The machine-implemented process of claim 8 wherein the automatically determined per interval metrics includes a per interval responses count associated with only an identified subset of wireless providers.

10. The machine-implemented process of claim 3 as carried out for a plurality of the said service requests and further comprising:

automatically and repeatedly applying first pre-canned queries to the first database where the query criteria includes one or more of the mobility parameters provided by the respective headers of the plurality of service requests.

11. The machine-implemented process of claim 10 as carried out for the plurality of service requests and further comprising:

automatically and repeatedly storing results of the applied first pre-canned queries in a second database.

12. The machine-implemented process of claim 11 and further comprising:

automatically and repeatedly applying second pre-canned queries to the second database for detecting emerging trends including those of system underperformance and or growing strain on system resources.

13. The machine-implemented process of claim 1 wherein the mobility parameters providing first header provides one or more of the following parameters:

an originating mobile device's unique ID;

an identification of a wireless provider that the service request originator device is coupled to at the time of the request;

an identification of a wireless connection type that the originator device was utilizing at the time of the request;

an identification of a mobile device operating system used by the originator device;

an identification of a mobile device firmware used by the originator device;

an identification of a geographic location from which the request was sent;

an identification of a cellular coverage zone from which the request was sent;

an identification of a parent Business Service Name associated with application code responsible for originating the request;

an identification of a Business Transaction Name associated with application code responsible for originating the request;

a mobile device application name having the application code responsible for originating the request; and an identification of one or more user gestures invoked immediately prior to the originating of the request.

14. The machine-implemented process of claim 1 wherein the first mobile device is a smart cellular phone.

15. The machine-implemented process of claim 1 wherein the first mobile device is a tablet computer having cellular phone connectivity capability.

16. A machine-implemented service request forming process implemented on respective mobile devices that are configured to communicate with a respective one or more service providing servers, the communication including a submitting of one or more service requests to one or more of the service providing servers, the service request forming process comprising:

instrumenting respective original application object code of respective ones of the mobile devices so as to thereby produce respective instrumented object code whose submitted service requests to one or more of the service providing servers include mobility parameter providing headers where the respective original application object code is that of a respective mobile client application executable by the respective ones of the mobile devices, and enabling execution of the respective instrumented object code in the respective ones of the mobile devices such that when the respective instrumented object code is executed in the respective ones of the mobile devices, the code executing mobile devices will output corresponding service requests including respective mobility parameter providing headers, the respective mobility parameter providing headers providing at least respective unique identifications for their respective mobile devices and at least one performance related parameter such that service requesting performances of individual ones of the respective mobile devices can be tracked.

17. The machine-implemented service request forming process of claim 16 wherein in addition to respective unique identifications for the respective mobile devices, the mobility parameters providing headers provide an identification of a wireless provider that the service request originator device is coupled to at the time the service request is output.

18. The machine-implemented service request forming process of claim 16 wherein in addition to respective unique identifications for the respective mobile devices, the mobility parameters providing headers provide an identification of a mobile device operating system used by the respective code executing mobile device.

19. A machine-assisted method for identifying likely areas of fault or failure in a machine system that comprises plural mobile devices capable of sending respective service requests to a corresponding one or more service providing servers by way of wireless communication, the method comprising:

querying a database containing prerecorded performance records of request servicing transactions involving at least a subset of the plural mobile devices, where the database includes searchable fields corresponding to mobility based headers and where the mobility based headers provide mobility tracking data indicative of mobility aspects of request servicing performances carried out for requests sourced from said at least subset of the plural mobile devices;

wherein the querying of the database looks for commonality of mobility tracking data in cases where corresponding query-found performance records report sub-par performance for one or more performance metrics of corresponding request servicing transactions of the corresponding query-found performance records.

20. A data processing system, comprising:
a network interface;
one or more non-volatile storage devices; and
one or more processors in communication with the network interface and the one or more non-volatile storage devices for receiving a first request via the network interface, the one or more processors configured to automatically detect if a first mobility parameter in a first header is present as part of a received first request sent from a respective first mobile device, the one or more processors configured to perform a corresponding one or more services in response to the first request and the one or more processors configured to automatically generate at least a first metric about the performance of one or more of the services performed in response to the first request, the one or more processors configured to use the acquired first mobility parameter from the first mobile device to search for metrics of other service requests and other services performances associated with mobility parameter data matching the first mobility parameter and to aggregate the first metric with the other metrics and to generate a corresponding aggregated metrics report.

21. The data processing system of claim 20 wherein the request accompanying headers can each provide plural mobility parameters and wherein at least one of the non-volatile storage devices is configured as a queriable database having as searchable fields thereof one or more of the mobility parameters so that the queriable database can be queried for records having specified values for one or more of the mobility parameters.

22. The data processing system of claim 21 wherein the plural mobility parameters comprise at least one of:
an originating mobile device's unique ID;
an identification of a wireless provider that the service request originator device is coupled to at the time of the request;
an identification of a wireless connection type that the originator device was utilizing at the time of the request;
an identification of a mobile device operating system used by the originator device;
an identification of a geographic location from which the request was sent; and
an identification of a cellular coverage zone from which the request was sent.

23. The data processing system of claim 21 wherein the plural mobility parameters comprise at least one of:
an identification of a parent Business Service Name associated with application code responsible for originating the request;
an identification of a Business Transaction Name associated with application code responsible for originating the request; and
a mobile device application name having the application code responsible for originating the request.

24. The data processing system of claim 20 wherein the one or more processors are configured to use the acquired first mobility parameter from the first mobile device to search for corresponding prerecorded histories of metrics of other service requests and of other services performances associated with mobility parameter data matching the first mobility parameter and to aggregate the first metric with the histories of the other metrics and to generate a corresponding aggregated metrics trending report corresponding to the first mobility parameter.

25. The data processing system of claim 20 wherein the one or more processors are configured to automatically determine per interval metrics associated with a plurality of service requests received by the one or more processors from respective mobile devices and where the automatically determined per interval metrics include a per interval responses count associated with only an identified subset of the respective mobile devices, the identified subset being associated with the first mobility parameter.

* * * * *